July 26, 1938. F. A. OZBURN 2,125,030

FISH LURE

Filed Aug. 3, 1937

Inventor

F. A. Ozburn

By Clarence A. O'Brien
Hyman Berman
Attorneys

Patented July 26, 1938

2,125,030

UNITED STATES PATENT OFFICE 2,125,030

FISH LURE

Floyd Allan Ozburn, Los Angeles, Calif.

Application August 3, 1937, Serial No. 157,185

2 Claims. (Cl. 43—39)

This invention relates to a fish lure, the present invention being an improvement over that forming the subject matter of a patent granted to me on August 22, 1933, No. 1,923,840.

The object of this invention is to provide means for causing a rippling and bubbling of the water as the lure is being retrieved, at any depth, so as to make the lure more life-like.

Another object is to prevent the lure from being caught in weeds and other foreign matter when it is being retrieved and also to cause it to release itself from weeds and the like which may be caught by the device.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
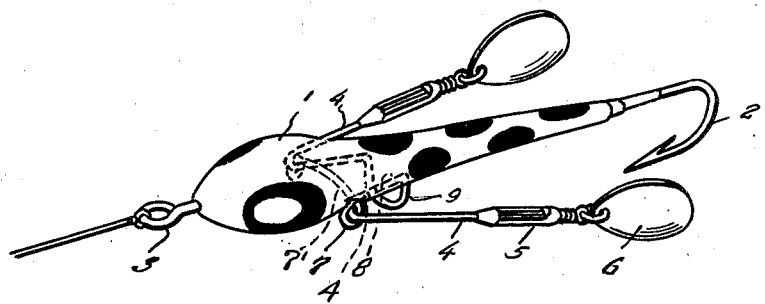
Figure 1 is a perspective view of the lure.
Figure 4:
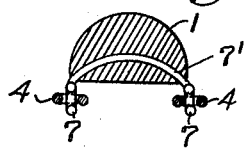
Figure 4 is a transverse sectional view through the device, the section being taken at the point where the eye carrying bar passes through the body.
Figure 2:
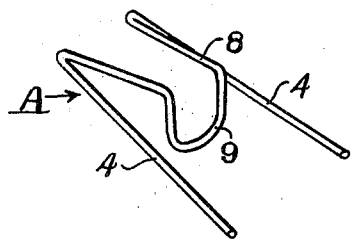
Figure 2 is a perspective detail view showing the bent part in the loop of the spinner carrying member.

In this drawing the numeral 1 indicates the body of the lure which may be of any desired shape and formed of any suitable material, the body having a hook 2 at its rear end and a line receiving eye 3 at its other end. The spinner carrying member A is composed, as in the patent, of the rearwardly and outwardly depending arms 4, one at each side of the body and each arm having a swivel 5 at its rear end to which the spinner 6 is connected, these arms passing through the eyes 7 depending from the body and then the arms pass rearwardly and are connected together to form the loop or U-shaped part 8. The eyes 7 are formed at the ends of a rod 7' which passes through the body with the eyes depending from the sides of the body. As stated in the patent this part 8 by engaging the underside of the body limits the upward movement of the arms and as the device is moved through the water the spinners 6 will revolve and they will simulate the wings of an insect so that fish will be attracted to the device.

The present invention consists in bending the rear part of the portion 8 downwardly to form the depending substantially U-shaped part 9 which extends downwardly from the bottom of the body. This part 9 will create a bubbling and rippling action in the water as the device is retrieved and at any depth in the water. This bubbling and rippling effect will make the device look like it is alive and it will also create a sort of haze around the lure which distorts the contour of the lure which results in many more strikes and catches than when this depending part was not used. Also this projecting part 9 acts as a forward check to the member A and thus it will prevent the lure from being choked by weeds and the like when the lure is being retrieved as this depending part will cause the water to swing the spinner carrying member backward, if it is in a forward position, and thus the water will wash off any foreign matter connected with the lure as it is being pulled through the water.

Figure 3:
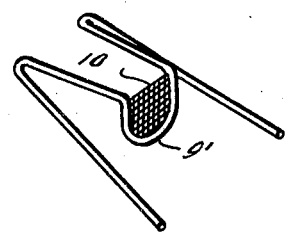
Figure 3 is a view of a modified form of the invention with the spinner carrying member in inverted position.

Figure 3 shows a slight modification in which wire mesh 10 is attached to the member 9' and fills the space formed by said member. This mesh increases the bubbling and rippling action of the water as the lure passes through the same.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed as new is:

1. A fish lure of the class described comprising a body, a hook connected therewith, a spinner carrying member swivelled to the underpart of an intermediate portion of the body and including rearwardly and outwardly depending arms, one at each side of the body, and a loop portion extending rearwardly along the bottom of the body from the swivel points and between the arms, the end of the loop extending downwardly and forming a depending U-shaped part, and spinners swivelled to the ends of the arms.

2. A fish lure of the class described comprising a body, a hook connected therewith, a spinner carrying member swivelled to the underpart of an intermediate portion of the body and including rearwardly and outwardly depending arms, one at each side of the body, and a loop portion extending rearwardly along the bottom of the body from the swivel points and between the arms, the end of the loop extending downwardly and forming a depending U-shaped part, and spinners swivelled to the ends of the arms, and a mesh extending across the space formed by the depending U-shaped part.

FLOYD ALLAN OZBURN.